(12) United States Patent
Brown et al.

(10) Patent No.: US 7,609,309 B2
(45) Date of Patent: Oct. 27, 2009

(54) CONTINUOUS CLOCKING OF TDI SENSORS

(75) Inventors: David Lee Brown, Sunnyvale, CA (US); Yung-Ho Chuang, Cupertino, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 788 days.

(21) Appl. No.: 10/992,063

(22) Filed: Nov. 18, 2004

(65) Prior Publication Data

US 2006/0103725 A1 May 18, 2006

(51) Int. Cl.
*H04N 3/14* (2006.01)
*H04N 5/335* (2006.01)

(52) U.S. Cl. .................... 348/295; 348/312

(58) Field of Classification Search ............... 348/295, 348/312; 356/237.1
See application file for complete search history.

(56) References Cited

U.S. PATENT DOCUMENTS

| | | | |
|---|---|---|---|
| 4,870,293 A * | 9/1989 | Elabd | 348/295 |
| 6,392,260 B1 | 5/2002 | Farrieret et al. | |
| 6,654,112 B2 | 11/2003 | Noguchi et al. | |
| 6,778,263 B2 | 8/2004 | Ortyn et al. | |
| 6,933,975 B2 * | 8/2005 | Wen | 348/312 |
| 7,212,240 B1 * | 5/2007 | Litwiller | 348/294 |
| 2003/0197857 A1 | 10/2003 | Yamashita | |
| 2003/0227617 A1 * | 12/2003 | Yoshida et al. | 356/237.1 |

* cited by examiner

*Primary Examiner*—Lin Ye
*Assistant Examiner*—Gevell Selby
(74) *Attorney, Agent, or Firm*—Smyrski Law Group, A P.C.

(57) ABSTRACT

A method and apparatus for propagating charge through a time division and integration (TDI) sensor is provided. The method and apparatus may be used with the TDI sensor to inspect specimens, the TDI sensor operating to advance an accumulated charge between gates of the TDI sensor. The design comprises controlling voltage waveform shapes for waveforms advancing the accumulated charge between gates in a substantially nonsquare waveform, such as a composite, sinusoidal, or other shaped waveform. Controlling voltage waveform shapes operates at different voltage phases in adjacent gates to provide a substantially de minimis net voltage.

66 Claims, 15 Drawing Sheets

1301

1302

1303

1304

CONTINUOUS CLOCKING OF TDI SENSORS

BACKGROUND OF THE INVENTION

1. Field of the Invention

The present invention relates generally to the field of electronic imaging, and more particularly to inspection of specimens such as semiconductor wafers and photomasks using TDI (Time Delay Integration) sensors.

2. Description of the Related Art

Many optical systems have the ability to inspect or image features on the surface of a specimen, such as inspecting defects on a semiconductor wafer or photomask. Certain advanced semiconductor defect inspection systems can detect defects on the order of 30 nm in size during a full inspection of a 300 mm diameter wafer. Such defects are seven orders of magnitude smaller than the wafer itself.

These types of optical systems may employ sophisticated sensors, including but not limited to TDI sensors. TDI sensors exhibit increased throughput for wafer inspection systems and photomask inspection systems over other types of sensors by more than one order of magnitude. FIG. 1 illustrates a typical TDI sensor. From FIG. 1, an array of pixels make up the imaging region 101. A current state-of-the-art TDI sensor according to FIG. 1 may contain a 256×2048 array or larger image area. In a typical arrangement, a lamp, laser beam, or other bright illumination source illuminates the semiconductor wafer surface. The wafer surface reflects light onto the TDI sensor, and at the points where light strikes the sensor the sensor may generate photoelectrons.

The TDI sensor typically scans a magnified image of the wafer. The sensor continuously accumulates charge as it scans the wafer, and the sensor transfers charge along a column of pixels 102 at generally the same rate at which the sensor moves with respect to the wafer image. In the orientation of FIG. 1, the sensor moves charge vertically from one pixel to the next.

TDI sensors typically contain channel stops 103, represented by the solid vertical lines in FIG. 1. These channel stops 103 prevent the movement of electrons or charge from one column to another within the imaging region 101. Electron movement is generally inhibited until the electrons reach the serial registers 104 at the edge of the sensor, where the serial registers are represented by gray rows of pixels.

When charge reaches the last pixel in a column, the charge moves to the serial register 104. The serial register 104 transfers the charge horizontally, pixel by pixel, until the charge reaches read-out stage and read-out amplifier or amplifiers 105. A transfer gate 106 or similar structure typically controls charge movement between the imaging region 101 and the serial register 104.

Certain TDI sensors have only one read-out amplifier 105, typically positioned at the end of the serial register 104. Other TDI sensors, such as the one shown in FIG. 1, have multiple read-out amplifiers 105 to decrease the time required to read the contents of the pixels in the serial register.

For several reasons, previous TDI sensors exhibit less than optimal functionality. Prior TDI sensors employ a method called "burst clocking," whereby the TDI sensor may transfer a charge from pixel to pixel, where the graph of voltage changes sharply from positive to negative and back again. Previous TDI sensors employing burst clocking do not exhibit optimal speed in transferring the pixel charge, and tend to be highly sensitive to timing jitter. Such sensors can exhibit high levels of power dissipation and have a relatively low charge transfer efficiency. Further, previous TDI sensors tend to exhibit high dispersion of clock waveforms, low modulation transfer functions, and a higher probability of electromigration. Further, TDI sensors employing burst clocking generally do not perform well when environmental conditions or subtle operating changes occur.

It would therefore be beneficial to provide a TDI sensor for use in conjunction with semiconductor wafer or photomask inspections that overcome the foregoing drawbacks present in previously known electronic imaging systems. Further, it would be beneficial to provide a sensing arrangement and overall optical inspection system design having improved functionality over devices exhibiting the negative aspects described herein.

SUMMARY OF THE INVENTION

According to one aspect of the present design, there is provided a method and apparatus for propagating charge through a time delay and integration (TDI) sensor. The method and apparatus may be used with the TDI sensor to inspect specimens, the TDI-sensor operating to advance an accumulated charge between gates of the TDI sensor. The design comprises controlling voltage waveform shapes for waveforms advancing the accumulated charge between gates in a substantially nonsquare waveform, such as a composite, sinusoidal, or other shaped waveform. Controlling voltage waveform shapes operate at different voltage phases in adjacent gates to provide a substantially de minimis net voltage fluctuation on ground and DC voltage reference planes.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

According to the present invention, there is provided a TDI sensing arrangement, potentially for use in an inspection system that employs continuous clocking to transfer charge between pixels. The present design may offer improvements over previously known TDI sensor designs.

Burst Clocking

Figure 1:
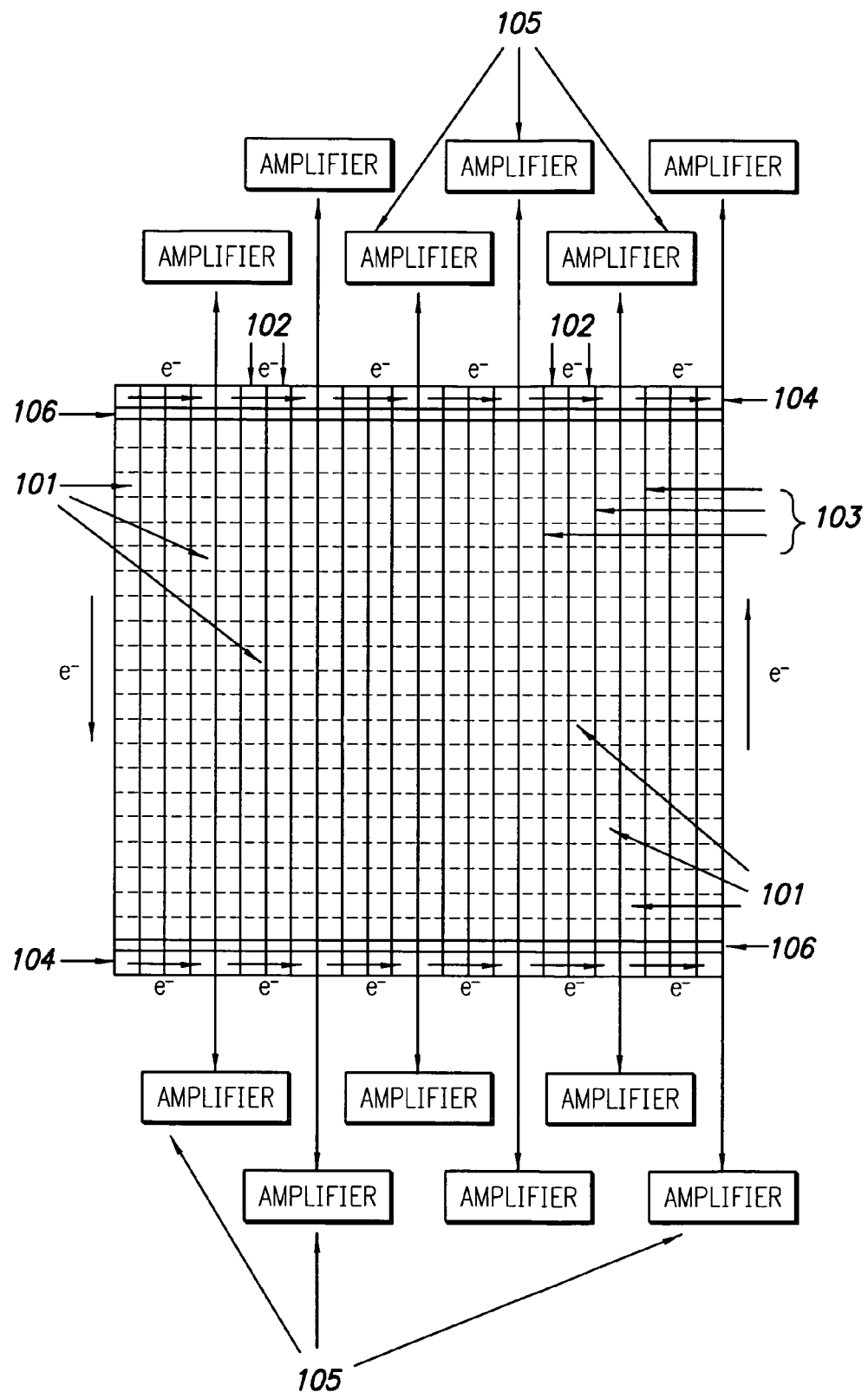
FIG. 1 illustrates construction of a typical high-speed multi-channel TDI sensor.
Figure 2:
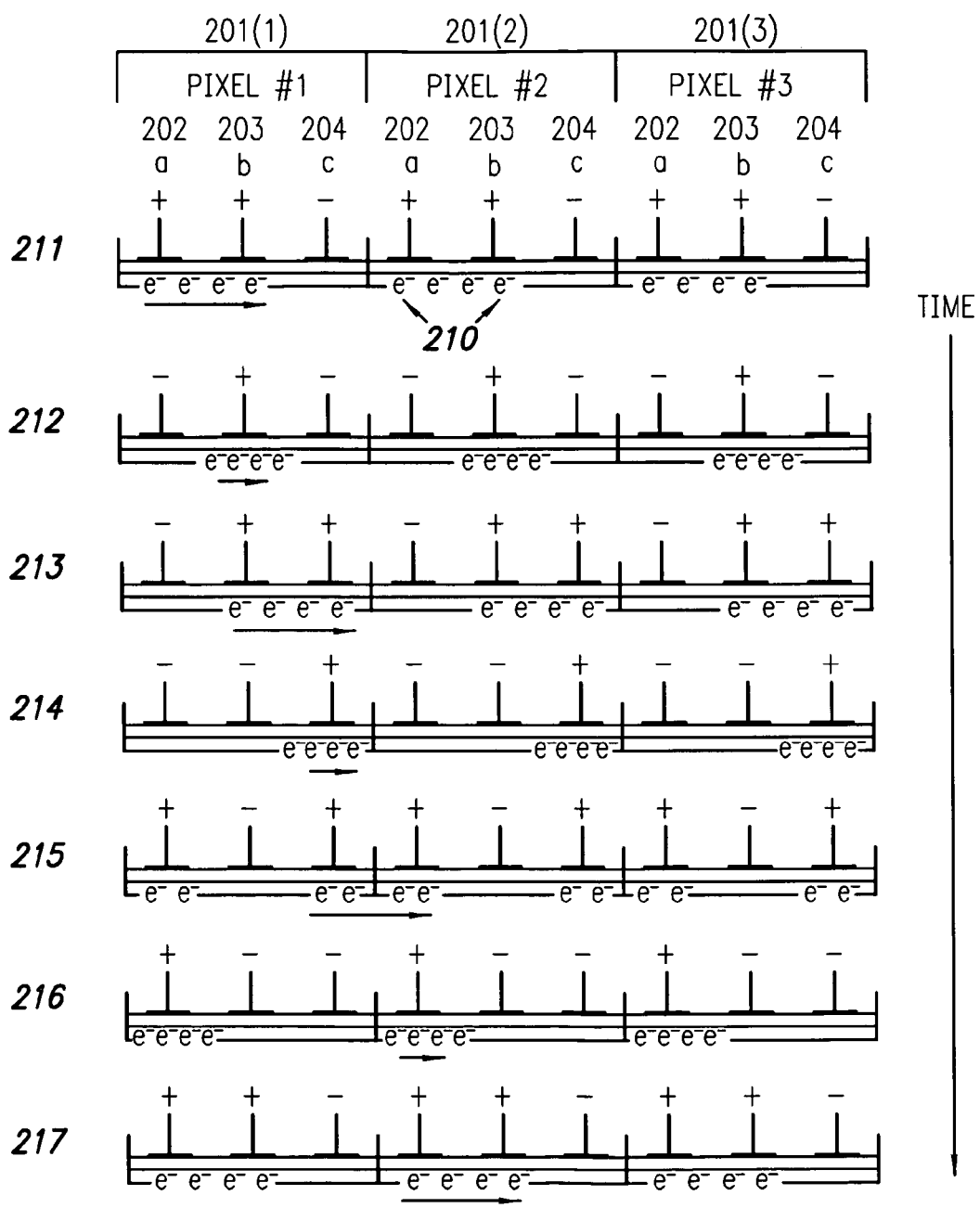
FIG. 2 shows three neighboring pixels in a column, each pixel comprising three polysilicon gates, with the pixels in seven different states.

FIG. 2 illustrates how previous TDI sensors move charge from one pixel to another within a column of pixels. FIG. 2 shows three neighboring pixels 201(1), 201(2), and 201(3) within a single column. The term "column" relating to FIG. 2 serves to explain how the charge moves vertically from pixel to pixel in FIG. 1. Each pixel comprises three polysilicon gates, labeled a 202, b 203, and c 204. This three-gate structure enables the charge to move in the desired direction.

FIG. 2 illustrates three pixels, each with three gates, in seven different states 211-217. In this example, the initial state of the TDI sensor is state 211. The TDI sensor advances to states 212, 213, and so forth sequentially as time progresses. State 217 is essentially equal to state 211, except the charge has moved forward by one pixel. FIG. 2 illustrates a cycle through which the TDI sensor passes each time the sensor moves charge from one row of pixels to another. In each successive stage, the pixels move one increment from left to right. This process occurs simultaneously in all columns of the sensor.

In the first state 211, the system electronics have applied a positive voltage to the a gates 202 and b gates 203 and a negative voltage to the c gates 204. The a gates 202 and b gates 203 attract the photoelectrons 210, marked e-. The c gates 204 repel the photoelectrons 210. The photoelectrons are therefore concentrated over a relatively broad area near both the a gates 202 and the b gates 203.

To convert to the second state 212, the system electronics change the voltage on all a gates 202 from positive to negative. As a result, only the b gates 203 attract the photoelectrons. The a gates 202 and c gates 204 repel the photoelectrons. In each pixel, the b gates 203 at this point attract all the photoelectrons which had previously clustered around both the a gates 202 and b gates 203 during the first state 211. The electrons have begun their progression from left to right.

To convert to the third state 213, the system electronics change the voltage on all c gates 204 from negative to positive. At this point, both b gates 203 and c gates 204 attract the photoelectrons, while the a gates 202 continue to repel them. In each pixel, the charges which had previously been only located around the b gates 203 during state 212 have spread out through a larger area near both the b gates 203 and c gates 204. At this point, the electrons have moved forward by one gate.

To convert to the fourth state 214, the system electronics change the voltage on all b gates 203 from positive to negative. At this point, only the c gates 204 attract the photoelectrons. The photoelectrons which had previously spread out in the vicinity of both the b gates 203 and the c gates 204 at this point concentrate near the c gates 204.

To convert to the fifth state 215, the system electronics converts the voltage on all a gates 202 from negative to positive. At this point, since both the c gates 204 and the a gates 202 attract the photoelectrons, the photoelectrons can move another step from left to right. Rather than crowding around the c gates 204, the electrons can expand throughout the area defined by the neighboring c gates 204 and a gates 202. In moving toward the a gates 202, the photoelectrons begin to enter the next pixel.

To convert to the sixth state 216, the system electronics convert the voltage on all c gates 204 from positive to negative. The photoelectrons which had been broadly clustered around the c gate 204 from one pixel and the a gate 202 in the next pixel are drawn only to the a gate 202. All photoelectrons thereby advance into the next pixel.

To convert to the seventh state 217, the system electronics convert the voltage on all b gates 203 from negative to positive. The electrons which had concentrated around only the a gates 202 now spread out over the area defined by both the a gates 202 and the b gates 203. The seventh state 217 is equivalent to the first state 211, except that the photoelectrons have moved forward by precisely one pixel.

In this way, the charge moves from pixel to pixel at the same rate at which the TDI sensor is traveling over the surface of the wafer. For simplicity, the foregoing discussion ignores the fact that light reflected from the surface of the sample onto the TDI sensor continues to generate photoelectrons in each pixel of the TDI sensor while the charge is moving.

Figure 3:
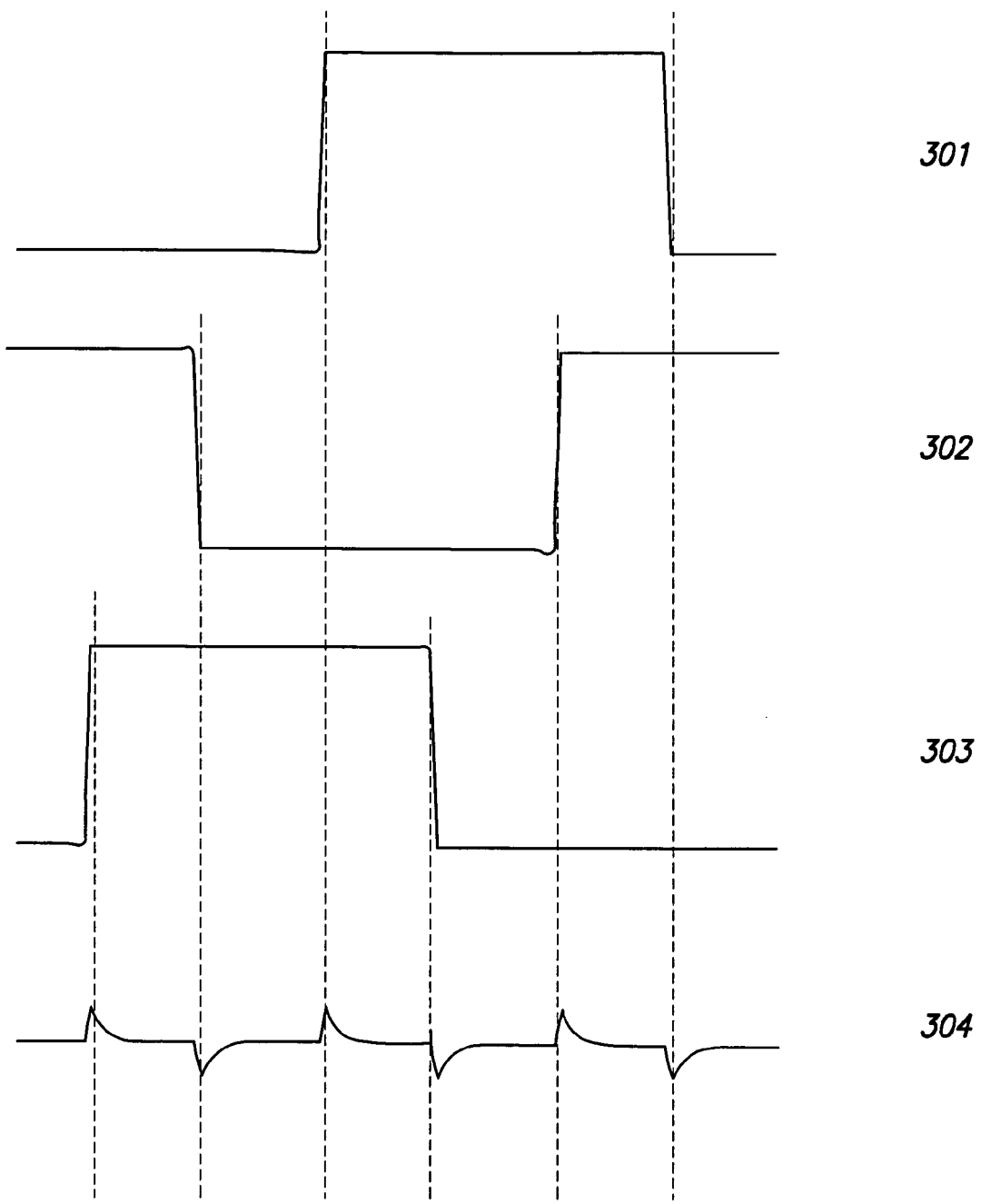
FIG. 3 represents graphs of voltage versus time for three gates, namely the a gates, b gates, and c gates, using square wave voltage applications, and a resulting voltage waveform that may appear on an imperfect ground return path.

FIG. 3 illustrates digital square waves by which the system electronics of previous TDI imaging systems change the voltage on the a gates 202, b gates 203, and c gates 204 to move the charge forward from one pixel to the next. The graph 301 illustrating the voltage on a gates 202 as a function of time shows how the voltage can move sharply from negative to positive, and then sharply from positive to negative at an appropriate moment, and completes one cycle while serial register gates are held relatively constant. This method is herein called "burst clocking," where burst clocking is a method by which the previous TDI sensor can transfer charge from pixel to pixel.

Graphs 302 and 303 in FIG. 3 represent voltage versus time on the b gates 203 and c gates 204 respectively. These graphs are temporally aligned with the graph 301 representing voltage versus time on the a gates 202. Taken together, graphs 301, 302, and 303 show shift in time between the digital square wave voltage patterns on the three gates. The residual voltage on an imperfect ground return path is also shown in graph 304, produced by the voltage changes on the a, b, and c gates. This time shift relationship facilitates moving the photoelectrons through the six step process of FIG. 2.

Moving charge using three gates per pixel enables the TDI sensor to move charge in either direction by adjusting the timing of the gates. To optimize throughput in a typical wafer or reticle inspection system, the TDI sensor may scan in one direction, stop a short time, and scan back in the opposite direction.

When the charge reaches the last pixel in a column, the charge has entered a serial register 104. The system electronics then move charge in a similar way, horizontally in the orientation shown in FIG. 2, until the charge reaches a read-out amplifier 105. The read-out amplifier 105 reads out the charge one pixel at a time. Bi-directional TDI sensors have been employed, where serial registers and rows of amplifiers may occupy both sides of the bi-directional TDI sensor.

Figure 4:
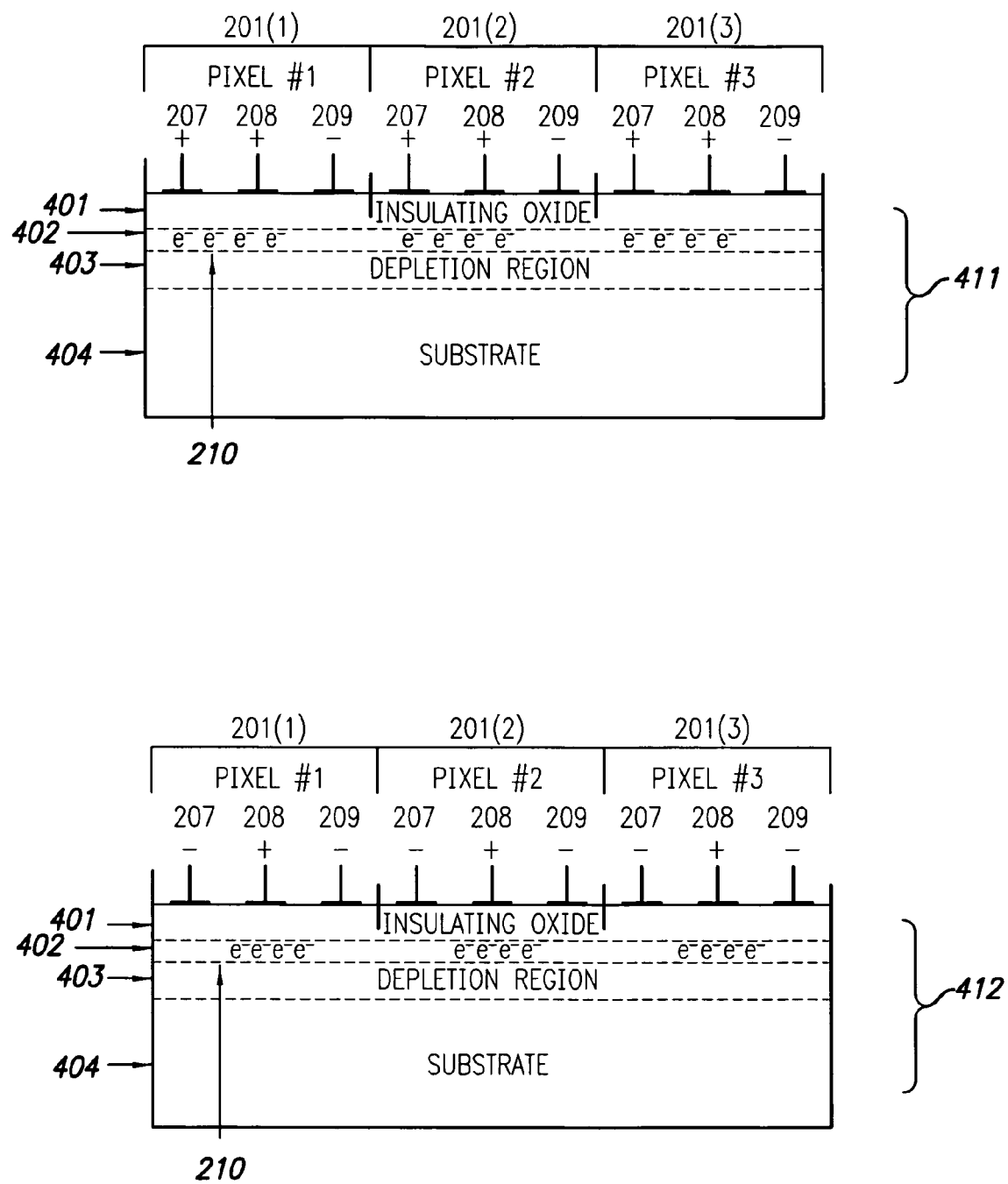
FIG. 4 illustrates two cross sections of a TDI sensor including three pixels, gates, an insulating layer beneath the gates, and a region of silicon or other suitable semiconductor material.

FIG. 4 shows the cross section of a TDI sensor, including three pixels 201, the a gates 207, b gates 208, and c gates 209, an insulating layer 401 such as silicon oxide beneath the gates, and a region 402 of silicon or other suitable semiconductor material beneath the insulating layer 401 where the photoelectrons 410 congregate near gates carrying a positive charge. The TDI sensor further includes a depletion region 403 of silicon where positive charge on the gates draws electrons and drives away positively charged holes, and the bulk of the silicon substrate 404.

FIG. 4 shows the TDI sensor in two states. The first state 411 where the a gates 207 and b gates 208 have a positive voltage and the c gates 209 have a negative voltage. The second state 412 differs from the first state 411 in that the voltage on the a gates 207 has switched from positive to negative.

TDI sensors can have one, two, three, four, or more gates per pixel. FIG. 4 shows a TDI sensor with three gates per pixel, common in many industrial applications. The TDI sensor has a structure resembling a capacitor with conducting polysilicon gates and bulk silicon on opposite sides of an oxide insulating layer. All the gates and the analog readout circuits on the TDI chip in this example share the same ground. In this arrangement, when the system electronics change the state of the sensor from the first state 411 to the second state 412 by switching the voltage on all a gates 207 from positive to negative using a square wave, the system electronics may inject a significant current into that capacitor. This current flows down the lines controlling the a gates 207 in every column of the sensor. As a result, a large displacement current flows through the capacitor and results in return current through the substrate to complete the circuit. The return current causes a spike of voltage noise 304. The current and the spike of voltage noise generally occur whenever the system electronics change the polarity of any gate.

This spike of voltage noise in the substrate can be problematic due to the sensitivity of the read-out amplifiers. The read-out amplifiers read signal voltages relative to the substrate voltage, and changes in the substrate voltage can create an error in the measurement. Signal voltages for each pixel can be on the order of a volt and voltage fluctuations can reach hundreds of millivolts due to the system electronics changing gate voltage by more than five volts into a high capacitance gate structure.

To meet sensitivity specifications at high speed, the TDI sensor needs to rapidly measure charge on each pixel with accuracy of the order of one millivolt. The TDI sensor may not be able to make such a measurement in the presence of the noise spikes which occur when the system electronics change the voltages on the gates. One way of addressing TDI sensor sensitivity has been to discontinue moving the charge from pixel to pixel within the columns of the TDI sensor (the vertical columns in FIG. 1) while the read-out amplifiers 105 read signals from the pixels in the serial register 104, the horizontal rows in FIG. 1.

The TDI sensor generally operates in a three part cycle. The first part moves the charge in the vertical columns from one pixel to another via the six-step process of FIG. 2. The second part awaits settling of the voltage fluctuations. The third part reads the contents of the pixels in the serial register 104. During the first two parts of this process, the readout amplifiers cannot operate. The readout amplifiers may need to wait until the two parts have completed to operate in a sufficiently noise-free environment that meets sensitivity requirements.

In earlier TDI sensors, this waiting time created fewer issues because the sensors typically included a single readout amplifier 105 at the end of each serial register 104. The read-out amplifier 105 sequentially read the charge in several hundred pixels. The time required to advance the charge in each column by one pixel, or to execute the six-step process illustrated in FIG. 2, accounted for only a small percentage of the total operation time. Pausing the serial register operation 104 and read-out amplifier 105 while moving the charge and waiting for the noise to settle may provide a relatively minor speed loss.

However, recent generations of high-speed TDI sensor have many amplifiers 105 spaced at short intervals along the serial register which read the signals from many pixels in parallel. Under these circumstances, waiting can constitute a significant percentage of the total operating time.

Timing jitter introduces noise in the image produced by the TDI sensor because the digital waveform frequency components leak or feed through into the measurement signal. Some degree of clock cancellation can be obtained by using four phase clocking and timing the clock edges so that opposing pairs operate together, but the digital timing jitter effects can result in far from ideal improvements.

The modulation transfer function (MTF) is a measure of how accurately the sensor represents the contrast of an image. For a given spatial frequency, the MTF is a number between 0 and 1, defined as the difference between the maximum light intensity and the minimum light intensity, divided by the sum of the maximum light intensity and the minimum light intensity at that frequency:

$$\text{MTF} = (I_{max} - I_{min})/(I_{max} + I_{min}) \tag{1}$$

The primary limitation on the MTF of previous TDI sensors employing burst clocking is that the wafer image moves continuously with respect to the physical sensor, but the recorded image moves discontinuously from pixel to pixel across the sensor. The result is that any given photon reflected from the wafer or photomask may be subject to a small but significant misregistration on the sensor that, in extreme cases, could be as high as plus or minus one half pixel. The discrete movement of the charge across the sensor combined with the continuous movement of the image across the sensor can slightly blur the image and may result in a reduced MTF.

Charge Transfer Efficiency (CTE) is a measure of the ability of the sensor to move electrons from one storage region to the next during a given clock cycle, expressed as a ratio between the number of electrons actually moved to the next storage region and the number of electrons the sensor attempts to move as a ratio between 0.0 and 1.0. A CTE close to 1.0 indicates the ability to move charge efficiently over many transfers from the most distant collection region to the readout location. The transfer efficiency requirement for a sensor may be greater than 0.9999 per transfer.

If the application requires the device to operate at a different line rate, the sensor can have fundamental clock frequency increased or reduced to achieve the new operating requirements. In this instance, the harmonic component frequencies associated with any filtered waveforms are generally proportionally increased or reduced. The filter is generally not adjusted. In these circumstances a smaller or larger or number of harmonics can pass to the device, thereby changing the detailed shape of the waveforms in a poorly controlled way.

Continuous Clocking

The present design tends to reduce the electronic noise associated with the TDI sensor and enable a TDI sensor to operate with faster overall data rates and resolution. The present design controls the detailed shape of the voltage waveforms that advance the accumulated charge from gate to gate within the image area of the sensor to address voltage noise in the sensor substrate. The present design also advances the charges in the image area using a voltage that changes gradually in a well controlled manner and with a sufficiently precise relationship to all other image area gate voltages.

Figure 11:
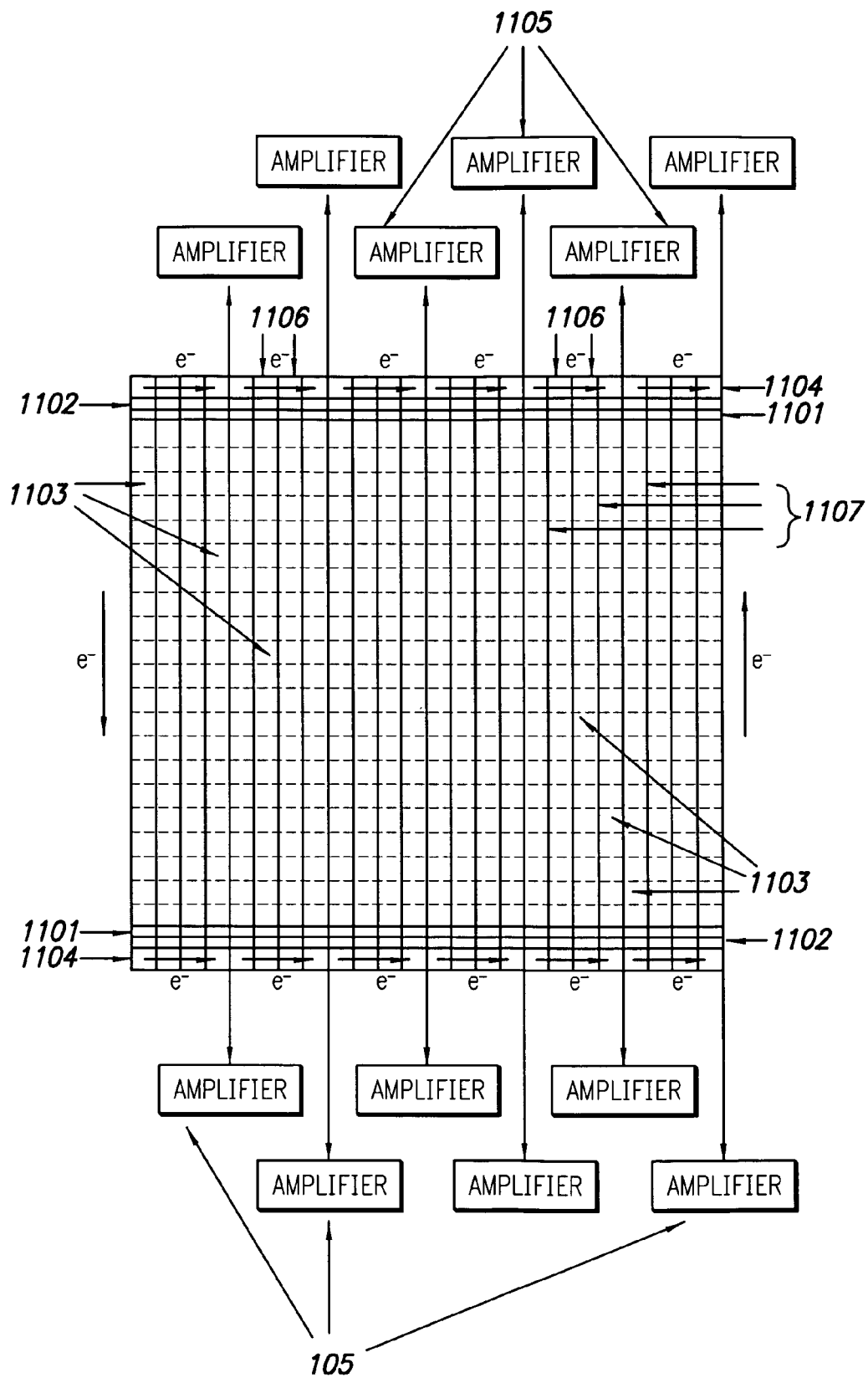
FIG. 11 includes an additional row of buffer gates interposed between the vertical image area and the transfer gates.

The image area consists of all the pixels 1103 in FIG. 11, excluding the serial register 1104, the transfer gate 1102, and the buffer gate 1101. Rather than changing the voltages on the gates using a nearly square wave as in FIG. 3, the present design changes the voltages on the gates in the image area with sinusoidally or nearly sinusoidally varying voltage waveforms as in FIG. 5. From FIG. 5, the sinusoidal voltage 501 on the a gates, the sinusoidal voltage 502 on the b gates, and the sinusoidal voltage 503 on the c gates are 120 degrees out of phase. The charge moves from gate to gate and from pixel to pixel generally in the manner shown in FIG. 2, except that voltage waveforms tend to be sinusoidal, relatively smooth, and the charge collection and charge movement is substantially continuous.

Figure 5:
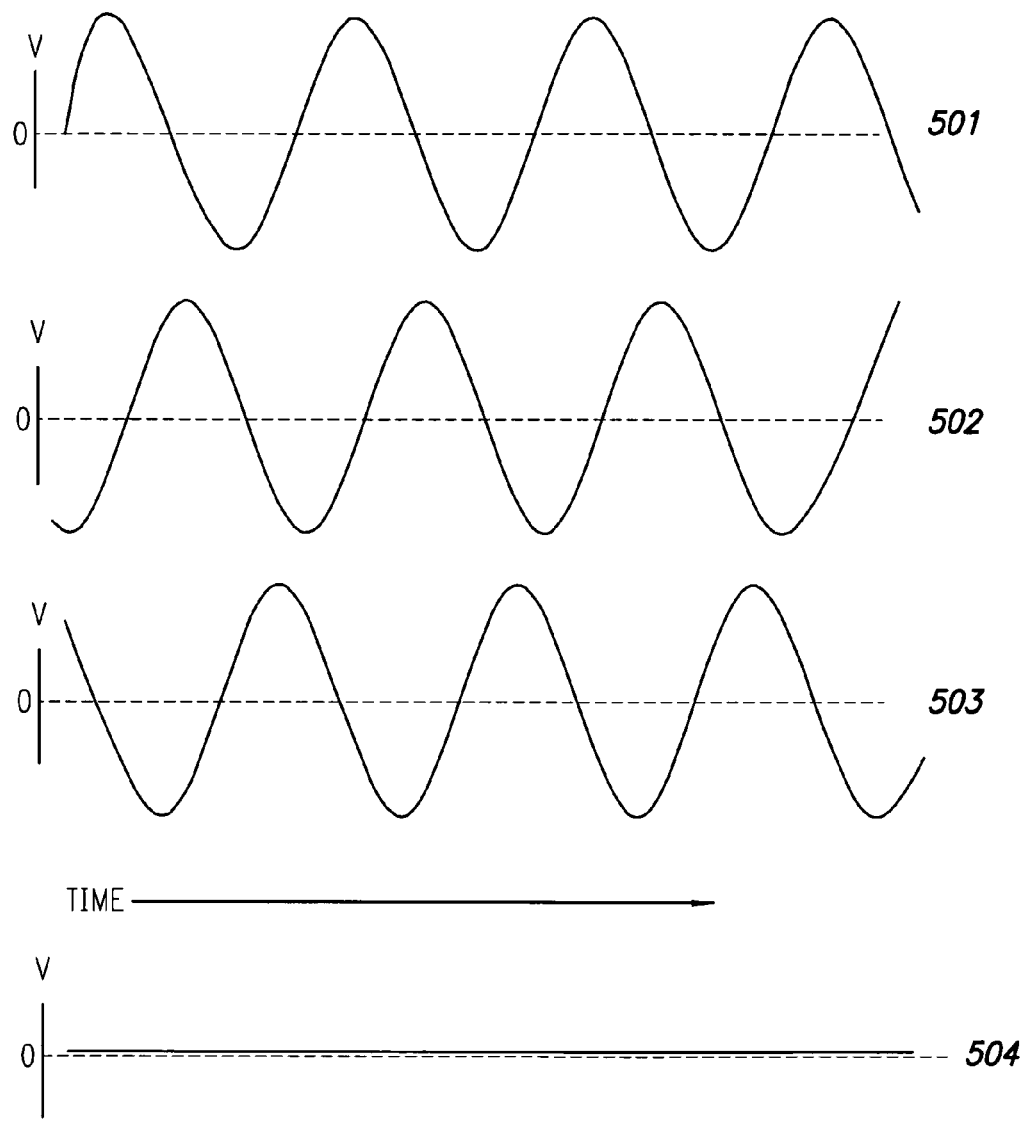
FIG. 5 represents the sinusoidal voltages applied to the a gates, b gates, and c gates and the resultant de minimis voltage sum.

FIG. 5 illustrates gate voltage waveforms for a TDI sensor with three gates per pixel in which the phases of the waveforms corresponding to the gates are shifted by plus or minus 120 degrees compared to adjacent phases. The present design may also apply to TDI sensors with two gates per pixel, where the phases of the two voltage waveforms corresponding to the gates may be shifted by 180 degrees compared to adjacent phases. The design may also apply to TDI sensors having four or more gates per pixel, where in the case of four or more gates per pixel the phases of the four voltage waveforms corresponding to the gates may be shifted by plus or minus 90 degrees compared to adjacent phases, and so forth. The present design may apply to TDI sensors wherein adjacent phases of the voltage waveforms are shifted by a number of degrees equal to 360 degrees divided by the number of gates.

The present design may be employed in TDI sensors having serial registers on one side, as well as for TDI or frame imaging sensors having serial registers on two sides. The present design may be used in TDI sensors having one readout amplifier per side, and may be advantageous for TDI sensors having multiple readout amplifiers per side that require high speed operation with optimum signal-to-noise ratios.

The present design generally controls the voltage continuously over time rather than generating one of two voltage states, high and low. Similarly useful results may be achievable using waveforms having various well-controlled shapes, such as sawtooth or piecewise linear patterns. Voltage waveforms may be digitally synthesized, including composite waveforms.

The conventional method for wave shaping TDI gate voltages is to low-pass-filter square waveforms generated with digital electronics. The sensor may also perform low-pass filtering of drive signals, where such low-pass filtering is location dependent within the device. However, the frequency-domain filtering of a square-wave signal is not optimal. Analog filters can transmit higher frequency components than desired and may distort the signal in undesirable ways. Further, the filter design typically determines the waveform shapes generated by low-pass filtering in advance, and these shapes generally cannot be controlled in a flexible manner during device operation.

The present design may synthesize the precise desired continuous waveform and amplify the shaped waveform using analog amplifiers to produce negligible high-frequency components at the output of the synthesizer. The original synthesis circuitry may be digital, but can exhibit low power characteristics and be well isolated using bypass capacitors and other appropriate electrical methods. Since none of the digital waveforms need to be amplified and passed to the sensor, isolation at this stage can be beneficial. The fundamental frequency of the digital synthesis stage can also be designed to optimize the isolation to prevent asynchronous signals from being generated that could increase the noise environment for sensor readout electronics. Synthesis circuitry can operate at a higher fundamental frequency than the TDI waveforms, enabling effective filtering in the configuration shown.

Transferring charge using a sinusoidal voltage wave rather than a square voltage wave generally requires lower peak currents to control the gates. As a result, the peak displacement currents flowing in the substrate is much lower, providing lower voltage fluctuations in the substrate and higher measurement sensitivity.

The shape and amplitude of sinusoidal voltage waveforms may be configured so that the sum 504 of the voltages on the a gates, the b gates, and the c gates is zero or near zero. Under these circumstances, the voltage waveforms generate a net substrate current of nearly zero, the total voltage noise in the substrate tends to be significantly lower, and the signal-to-noise ratio of the sensor can be higher. Additional optimization to compensate for capacitance differences between phases can further reduce net return current. Because the capacitance of the TDI gates for each phase is often not identical and the induced currents tend to be proportional to capacitance, the voltages of the waveforms may be selected such that the resulting currents generally cancel locally within the substrate. This current cancellation can reduce the total voltage noise in the substrate caused by moving charge from pixel to pixel and may reduce or eliminate the requirement of waiting for the substrate voltage fluctuations to settle before reading the contents of the pixels in the serial register 1104.

The readout amplifiers may be operated and charge in the image area transferred simultaneously at high speed without degradation to the noise performance. The low levels of voltage fluctuations in the substrate caused by the sinusoidal voltage waves enable the system to read the contents of the pixels in the serial register with sufficient sensitivity when the sensor is transferring charge in the image area. The readout amplifiers may operate while continuously moving the charge in the image area from one pixel to another. The peak line rate, or line transfer time, for the sinusoidal voltage waves is generally slower than the line transfer time of the square voltage waves used in burst clocking. The frequency components of the square waves are thus higher than the sine wave. In this environment, the overall data rate of the sensor using sinusoidal waveforms may increase despite the slower instantaneous line rate because of the lower voltage noise may be at a level sufficient to allow the read-out amplifiers to operate in a near-continuous manner.

Figure 13:
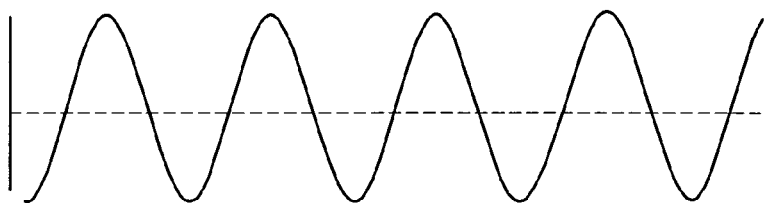
FIG. 13 shows the voltage waveforms that may be applied to the last image storage gate, buffer gate and the digital square voltage waveform that may be applied to the transfer and serial register gates.
Figure 13:
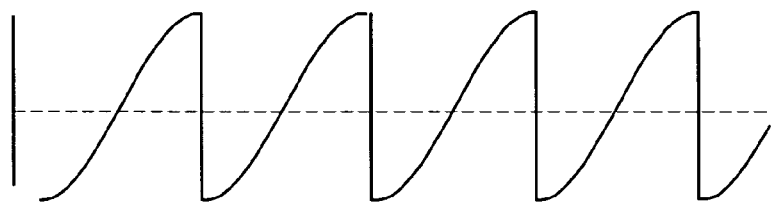
Figure 13:
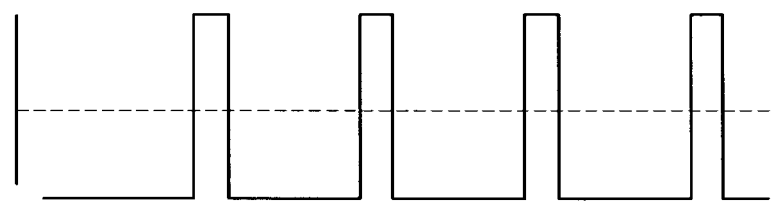
Figure 13:
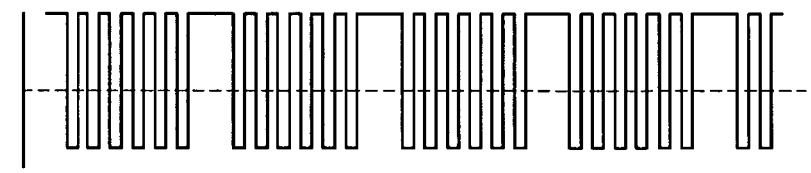

Operation of the readout amplifiers and the transfer of charge within the serial registers cease during time needed to transfer charge from the transfer gate 1102 to the serial register 1104 as shown in FIG. 11. The waveform 1303 for the transfer gate and for one phase of the serial register 1304 are shown in FIG. 13. The readout amplifiers of the sensor operate continuously except when the sensor loads charge from the image area buffer into the serial register. The sensor image area gates 1301 generally operate continuously with the possible exception of the buffer gates 1302.

Since the sinusoidal voltage waveforms are generally smoother than the square voltage waveforms and the resulting feed through currents cancel one another, voltage fluctuations due to timing jitter errors tend to be small. Furthermore, near-sinusoidal voltage waveforms tend to contain fewer high frequency components. Such high frequency components tend to be limited to a fundamental frequency, or a fundamental frequency plus a slight amount of added harmonics. The resultant high frequency components tend to exist within a limited, well-controlled bandwidth. The noise levels in all readout amplifiers remain substantially equal in character and degree.

The peak currents needed to generate a sinusoidal voltage waveform can be relatively low, and the cancellation effects can greatly reduce the power dissipation in the ground return path. The resultant lower power dissipation within the TDI substrate can potentially increase the signal-to-noise ratio compared to square-wave or burst clocking. The relatively lower chip temperature tends to substantially reduce the "dark" current, contributing to lower noise levels within the TDI sensor.

The sinusoidal voltage waveform moves charge from gate to gate and from pixel to pixel more continuously than the square voltage wave. The movement of charge across the sensor more closely resembles the continuous physical movement of the sensor relative to the semiconductor wafer or photomask. As a result, the modulation transfer function tends to be higher. The sensor tends to add fewer spurious signal photoelectrons to dark areas of the image and lose fewer signal photoelectrons from bright areas of the image. Any given photon reflected from the wafer or photomask remains registered on the sensor to an area typically much less than one pixel.

With sinusoidal voltage waves, the TDI sensor may also be less vulnerable to electromigration effects caused by high peak currents and thermal stress.

Digital synthesis of the TDI drive signals enables alteration and optimization of the detailed waveforms for each sensor and adjustments depending on operating conditions or application. Different operating speeds may be employed, and digital synthesis allows virtually continuous adjustment of the waveform shape to retain optimum performance throughout the operating range. The design also allows performance data for each sensor and board combination to be measured and to calibrate out nonlinearities and other residual effects.

Use of synthesized waveforms enables rapid changing of signal frequency content during device operation. For example, the buffer gate may have a relatively slow and smooth partial sine waveform for a period of time before reverting to a fast sharp-edged waveform.

Figure 15:
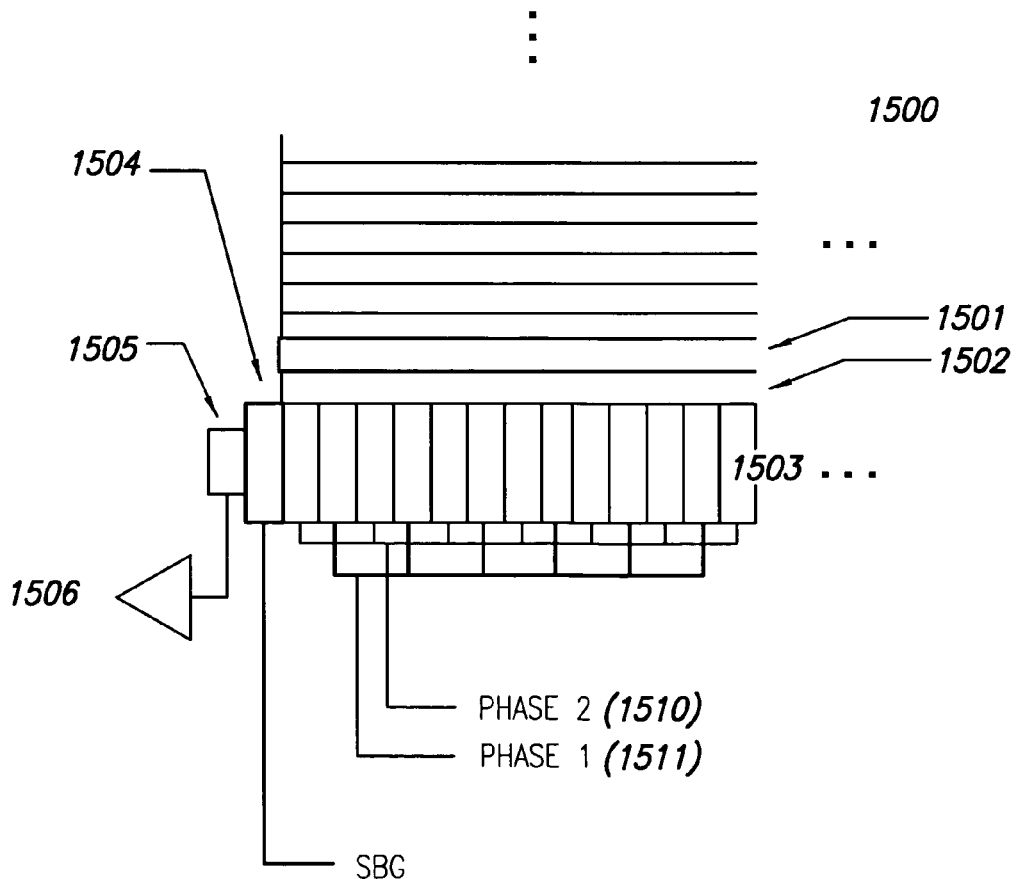
FIG. 15 is the serial output region of a sensor including a buffer gate, transfer gate, serial register, serial buffer gate, floating diffusion implant, and output amplifier stage.

A similar arrangement for clocking the imaging area can also be used to operate the serial registers. FIG. 15 illustrates a TDI sensor design with both a buffer gate in the image area 1501 and a serial buffer gate 1504 in the serial register area.

Waveform Generation

Figure 6:
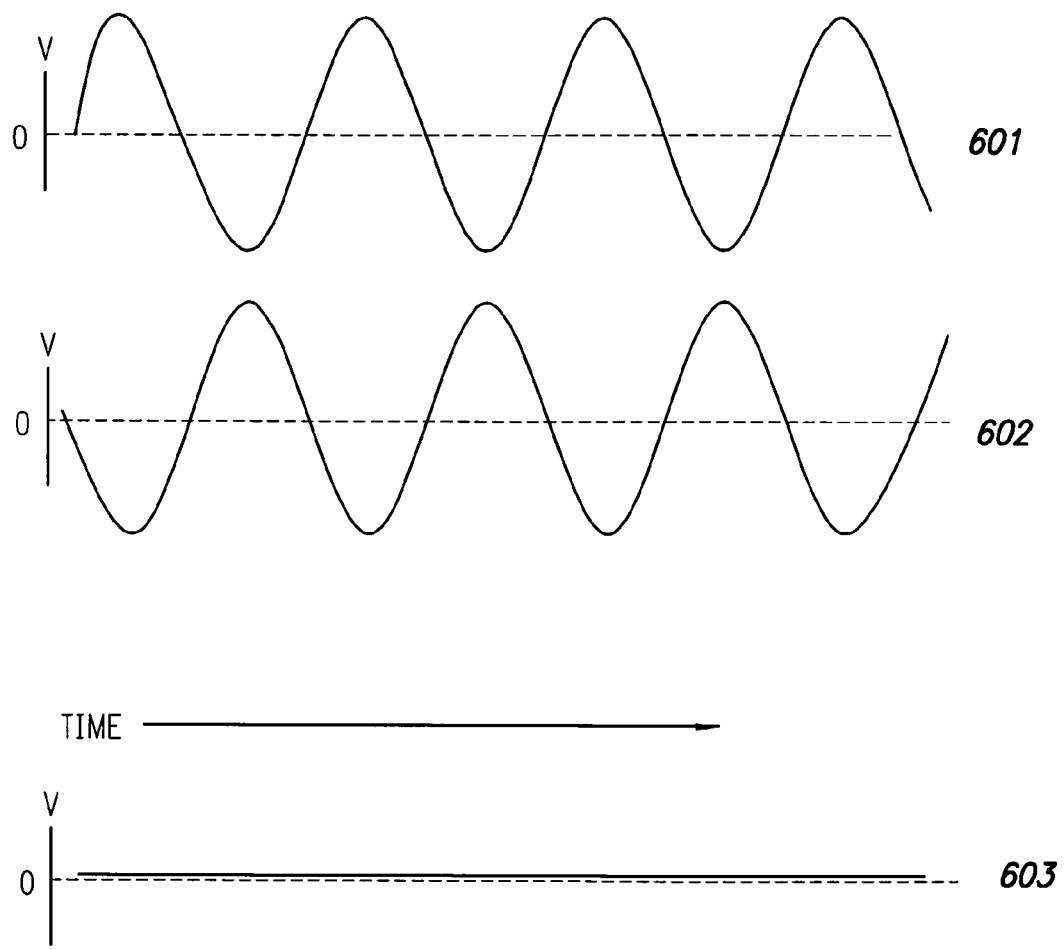
FIG. 6 shows sinusoidal voltage waveforms for a TDI sensor with two gates per pixel.
Figure 7:
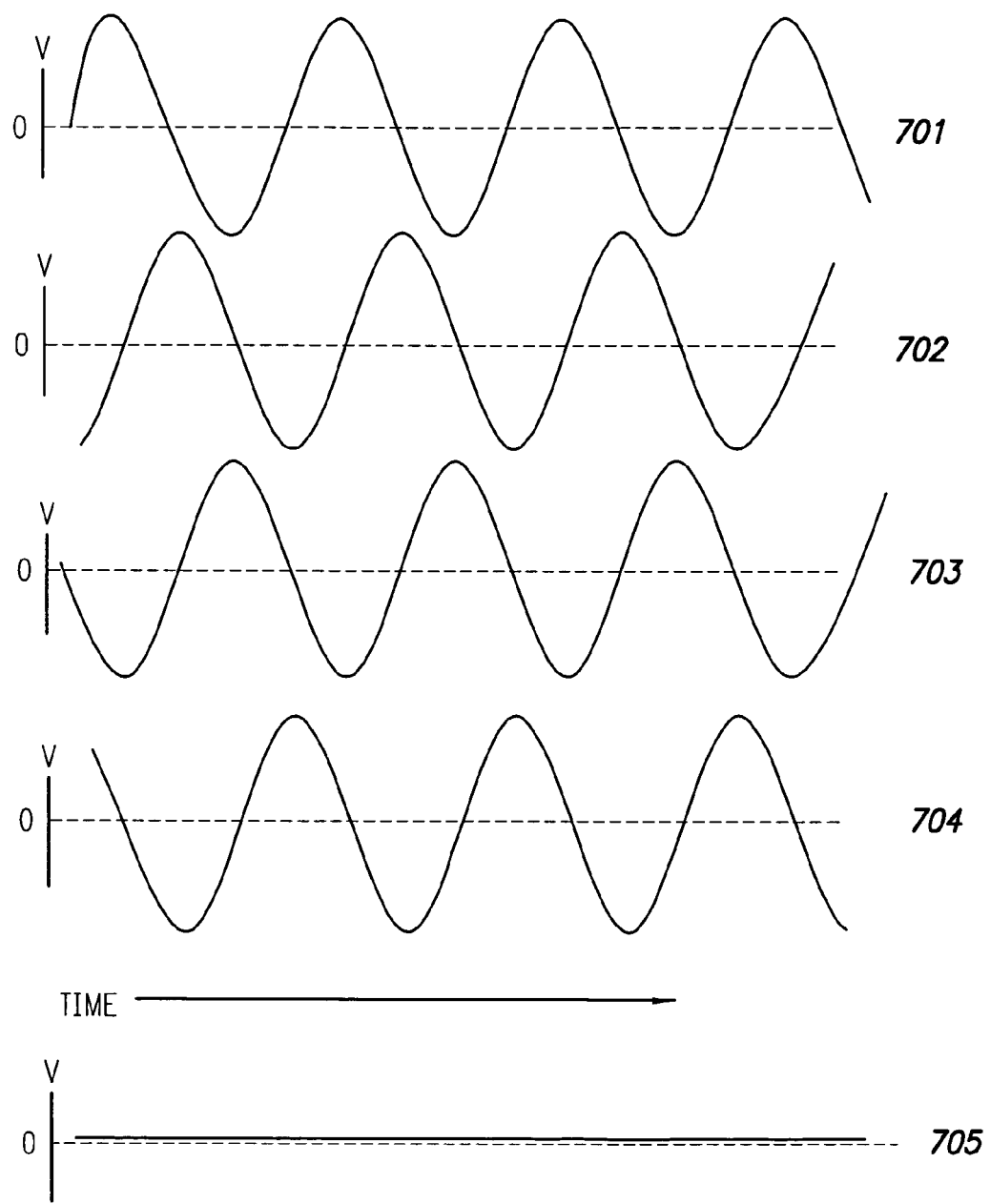
FIG. 7 represents sinusoidal voltage waveforms for a TDI sensor having four gates per pixel.

FIG. 6 shows the sinusoidal voltage waveforms for a TDI sensor with two gates per pixel. The sinusoidal voltages on the a gates in graph 601 and the sinusoidal voltages on the b gates in graph 602 are approximately 180 degrees out of phase. The sensor clock feedthrough is lowest when the ground return current induced by the combined voltage waveforms in graph 603 on the a and b gates is zero. FIG. 7 shows the sinusoidal voltage waveforms for a TDI sensor having four gates per pixel. The sinusoidal voltages on the a gates is shown in graph 701, the b gates in graph 702, the c gates in graph 703, and the d gates in graph 704 are 90 degrees out of phase with voltages of adjacent gates. For sinusoidal voltages the ideal sensor delivers the highest signal-to-noise ratio when the sum of the voltage waveforms on all four gates is zero at all times, such as is shown in graph 905. The slightly different capacitance of each gate and the non-linearities of the physical device may result in small deviations from the ideal case. These deviations can be compensated by selecting amplitude for each phase and/or pre-distorting the drive waveforms based on predictions or device measurement results. The corrections allow minimum clock feed through even in the presence of non-ideal conditions.

Figure 8:
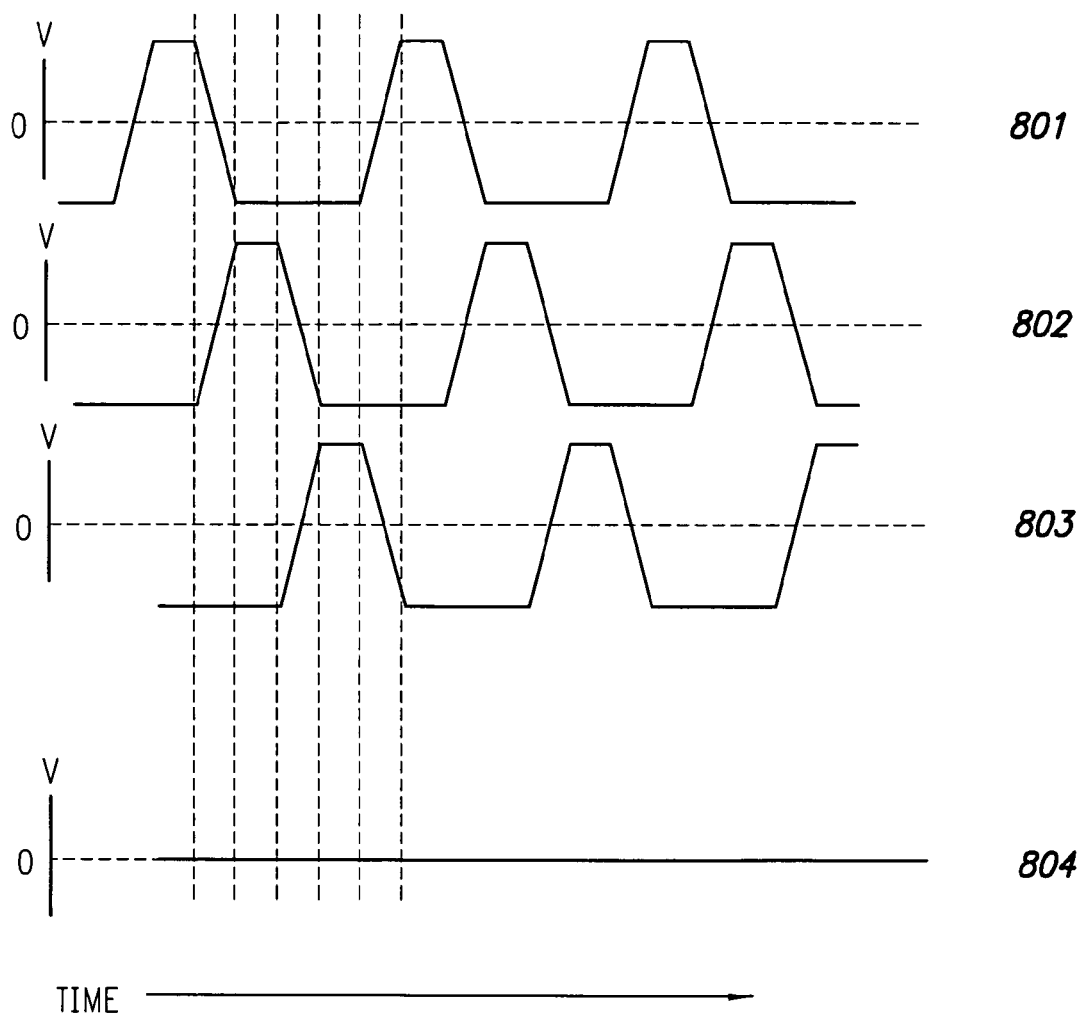
FIG. 8 shows addressing diminished storage capacity by transferring charge from each gate using trapezoidal voltage waveforms.

In the event each pixel cannot store the fully rated capacity of electrons, or in other words exhibits diminished storage capacity, the system may increase the amplitude of the sinusoidal voltage waveforms above the level required for square-wave burst-clocking. An alternate way to address diminished storage capacity is to transfer the charge from each gate using trapezoidal voltage waveforms, such as those shown in FIG. 8. In FIG. 8, the trapezoidal voltages on the a gates, the b gates, and the c gates, graphs 801, 802, and 803, respectively, are 120 degrees out of phase and apply to a TDI sensor with three gates per pixel. The system may minimize substrate noise by arranging the trapezoidal voltage waveforms so that the sum of the slopes of the voltage waveforms on the a gates, the b gates, and the c gates is zero. In each instant one of two conditions is satisfied in order to produce minimum ground path return current. For the first condition two of the three gates operate with opposite voltage swing, while the third gate has fixed voltage in time. For the second condition all gates have fixed voltage in time.

Figure 9:
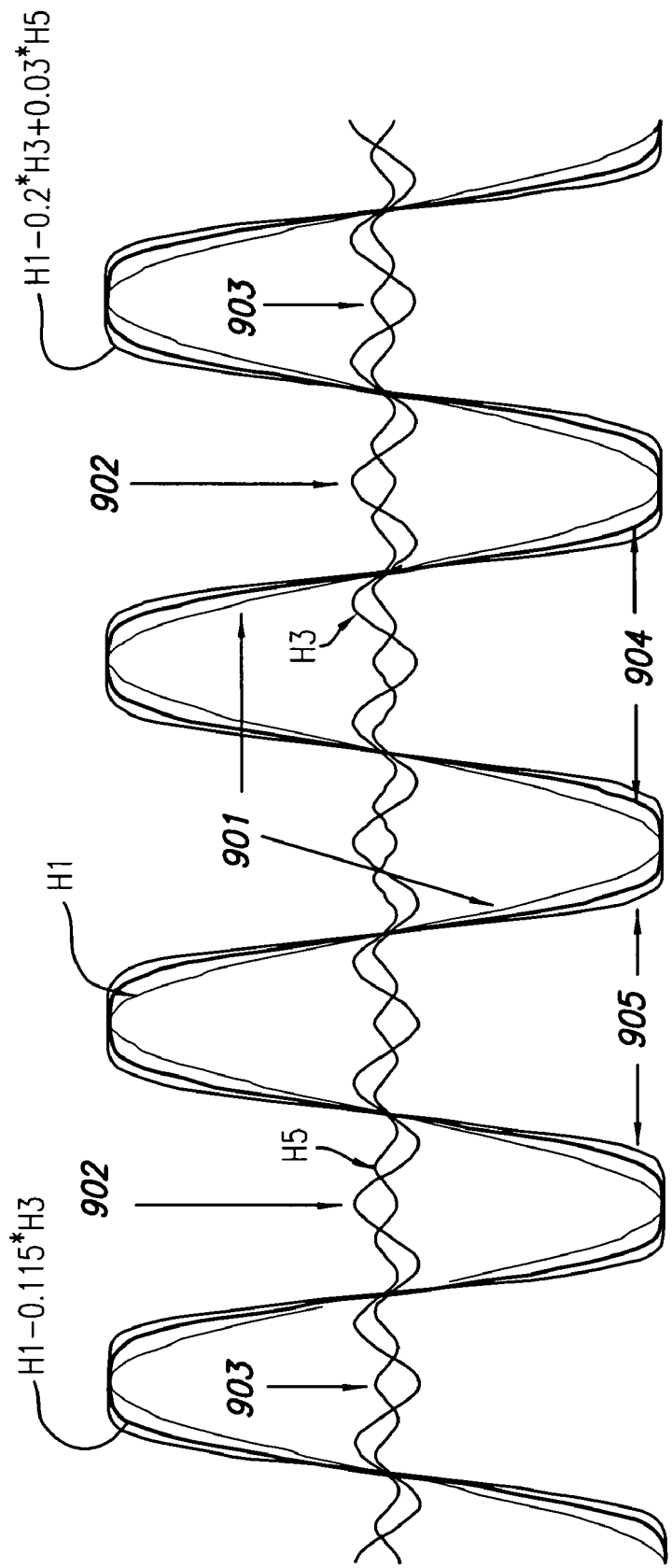
FIG. 9 is "flattening" the tops and bottoms of the fundamental sinusoidal waveforms by creating a composite waveform.

Yet another way to address diminished storage capacity is to "flatten" the tops of the fundamental sinusoidal voltage waveforms operating at the line rate frequency by mixing in small amounts of odd harmonics. FIG. 9 demonstrates "flattening" the tops and bottoms of the fundamental sinusoidal waveforms 901 by creating a composite waveform, or by adding small amounts of the fundamental frequency's $3^{rd}$ 902 and $5^{th}$ 903 harmonics to the fundamental frequency.

The first composite waveform 904 is the waveform resulting from subtracting the $3^{rd}$ harmonic with 11.5% of the amplitude of the fundamental frequency from the fundamental frequency itself. The waveform 904 flattens out at the top and bottom.

The second composite waveform 905 is the waveform provided by adding a $3^{rd}$ harmonic with 20% of the amplitude of the fundamental frequency to the fundamental frequency, and subsequently adding a $5^{th}$ harmonic with 3% of the amplitude of the fundamental frequency. The top and bottom of this composite waveform 905 flatten out even more than those of the previous composite waveform 904.

Figure 10:
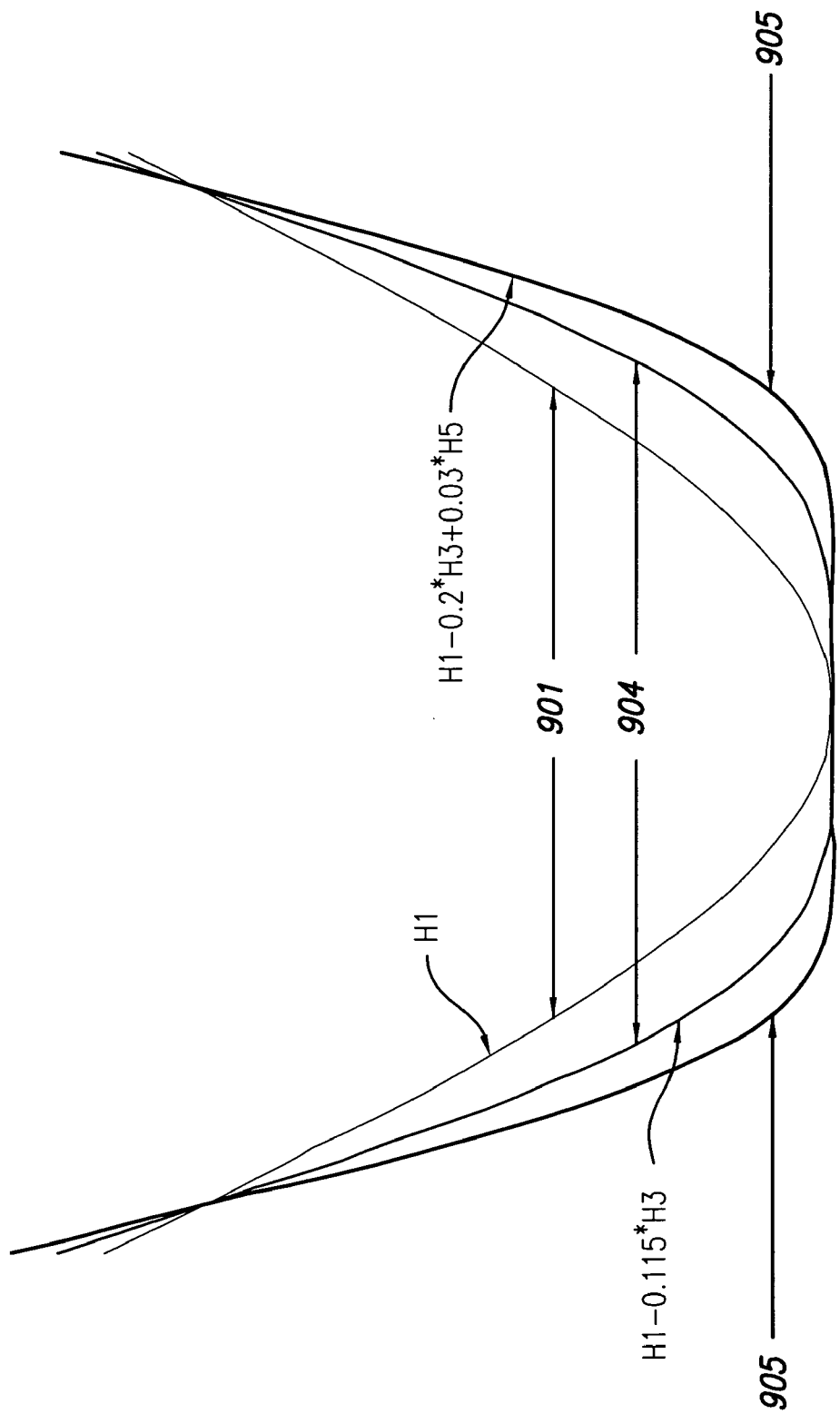
FIG. 10 illustrates enlarged views of the fundamental frequency, the first composite waveform, and the second composite waveform.

FIG. 10 shows enlarged views of the fundamental frequency 901, the first composite waveform 904, and the second composite waveform 905. The composite waveforms 904 and 905 can provide a greater storage capacity per pixel than the fundamental waveforms while tending to rise and fall more slowly than the square waves from FIG. 3 and subsequently can create less voltage noise in the substrate.

Difficulties may be encountered when arranging or providing composite waveforms such as waveforms 904 and 905 such that the net ground return current is zero. Composite waveforms may be arranged so the sum of slopes of the contributions from the fundamentals is zero or de minimis, but the sum of the contributions from the 3$^{rd}$ harmonic components of each phase does not cancel, and in fact adds, and therefore generates net displacement currents in the substrate. Displacement currents induced this way are still relatively small because the amplitude of the harmonic waveforms is low. Also, since displacement currents tend to create regular and predictable voltage noise, the system can more easily compensate for this voltage fluctuation at the read-out amplifier by synthesizing the inverse of the feedthrough and canceling the effect. Alternately, the system may be configured to not generate a 3$^{rd}$ harmonic component. In a three gate per pixel sensor, the system can use a 5$^{th}$ harmonic to flatten the sinusoidal waveform. The return currents from the 5$^{th}$ harmonic components tend to both flatten the waveform and cancel when properly phased.

The TDI sensor may include a row of gates 1101 interposed between the vertical image area and the transfer gates 1102, as shown in FIG. 11. Structurally, each buffer gate in the row of buffer gates 1101 may be similar to the three gates comprising a pixel in the vertical image area 1103 of the TDI sensor. However, the system drives the buffer gates 1101 in a different manner to render them compatible with both the continuous clocking of the input side (the vertical image area 1103) and the discontinuous clocking on their output side (the transfer gate 1102 and the horizontal serial register, 1104).

FIG. 13 shows a voltage waveform 1302 that may be applied to the buffer gates 1101. For the majority of each clock cycle, the voltage on a buffer gate slowly increases to a peak value, resembling the waveform transmitted over the pixels in the image area 1301, where the charge moves by continuous clocking. The charge transfers from the final pixel of the vertical image area 1103 into a buffer gate 1101 at a similar rate at which the charge has generally moved from gate to gate within the vertical image area.

When the voltage on a buffer gate reaches a peak value, the voltage drops sharply 1302. As a result, the charge transfers quickly from the buffer gate 1101 through the transfer gate 1102 with voltage waveform 1303 and into the horizontal serial register 1104. In this manner the serial register waveform 1304 does not need to pause for an extended period of time waiting for the charge to arrive and the imaging region waveforms can operate continuously.

The steep slopes of the voltage waveforms on the transfer gate 1303 and the buffer gate 1302 can create displacement currents and voltage noise in the substrate. Since the gate area and corresponding total capacitance is typically a very small fraction of the image area gates, this effect is relatively small. However, if further minimizing of voltage noise is desired, the present design may drive the buffer gates and the transfer gates using digital square voltage waveforms 180 degrees out of phase with each other and using conventional wave shaping low-pass filter techniques.

Figure 14:
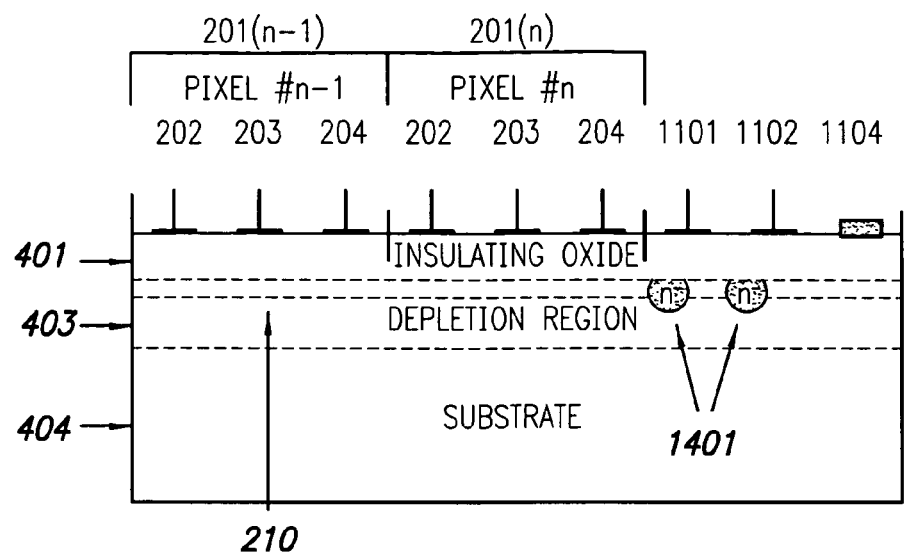
FIG. 14 illustrates a region of the buffer and transfer gates doped with impurity atoms.

Driving the buffer gates and the transfer gates with relatively fast voltage waveforms 180 degrees out of phase with one another provides a condition where charge may flow in the reverse of the desired direction, or from the buffer gate back into the image region. Part of the regions of the buffer gate 1101 and transfer gate 1102 may be doped with impurity atoms 1401, as shown in FIG. 14, to supply a built-in voltage which prevents the backward movement of charge into the image region 204.

The system may provide waveforms so the transition times between pixels and gates are relatively longer than the timing jitter between waveforms. Providing the longest practical transition times can reduce high-frequency fluctuations and can reduce peak substrate currents.

Figure 16:
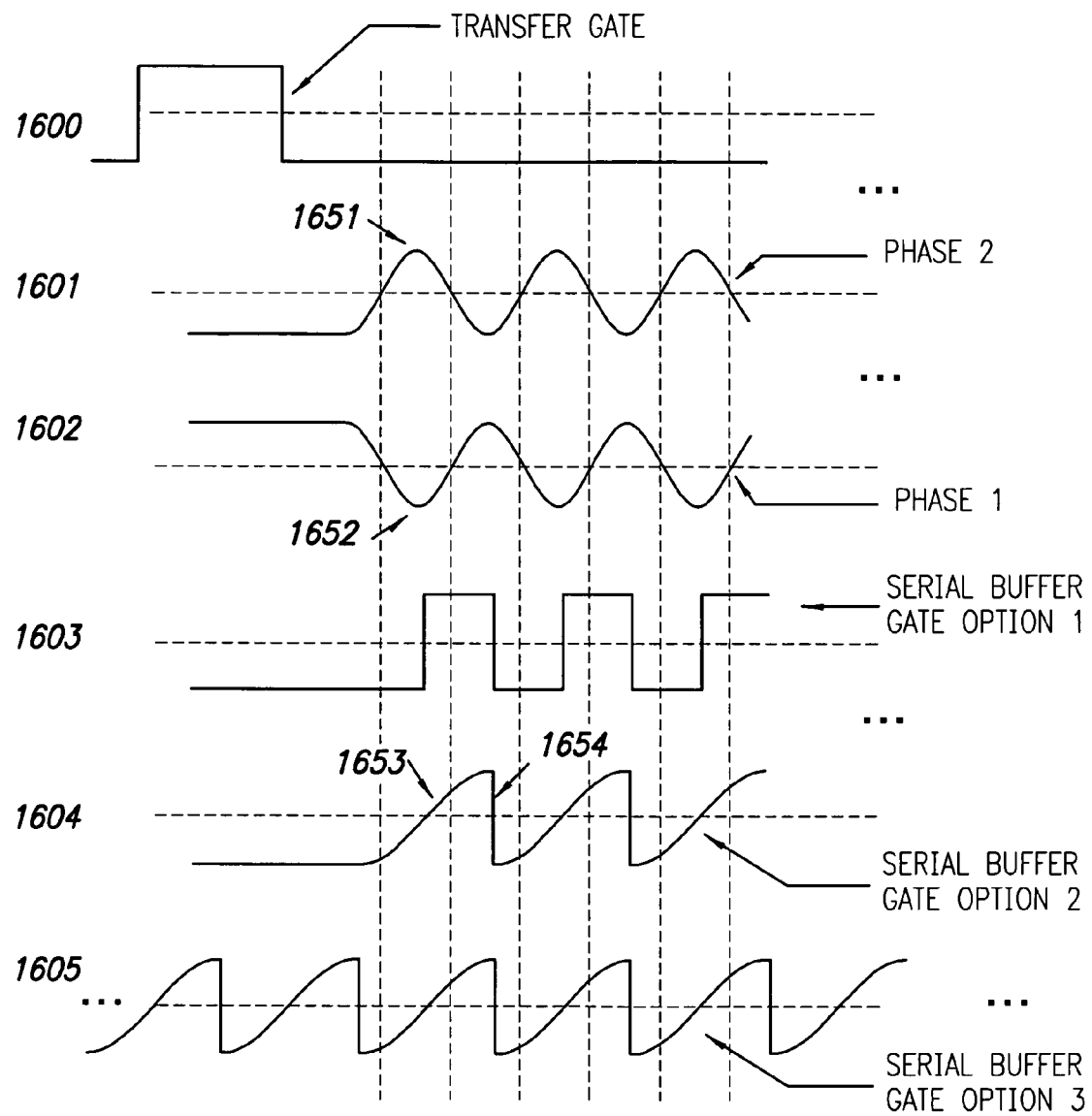
FIG. 16 shows the timing and qualitative waveform shapes suitable for continuous clocking and improved signal-to-noise performance of the serial register region.

FIG. 15 shows the serial output region 1500 of a sensor including a buffer gate 1501, transfer gate 1502, serial register 1503, serial buffer gate 1504, floating diffusion implant 1505, and output amplifier stage 1506. While low speed sensors typically have one serial output region such as that shown in FIG. 15, a high-speed device may include many such regions placed adjacently for simultaneous readout. FIG. 16 shows the timing and qualitative waveform shapes suitable for continuous clocking and improved signal-to-noise performance of the serial register region. The image region transfer gate 1600 is shown for reference and comparison to other timing signals. The two-phase device timing case shown incorporates sinusoidal waveforms displaced by 180 degrees where the sum of the slopes results in a zero or near zero net return ground current to the substrate. The voltages of the two waveforms may differ slightly to compensate for differences in capacitance of each phase so the resulting cancellation of return currents can be improved. One option for the serial buffer gate waveform is a square wave 1603 synchronized to the phase 1 waveform 1602 and phase 2 waveform 1601. This square wave drive method may be used for high-speed and high-signal-to-noise operation. Alternately, the serial buffer gate voltage waveform 1604 may be a composite waveform including a sinusoidal portion 1653 and a step portion 1654. The step portion tends to move charge quickly from the serial buffer gate region into the floating diffusion region. The remainder of the composite waveform smoothly returns the voltage to the requisite level at a time just before the step portion. This composite waveform generally has the same fundamental frequency as the square wave but less high frequency harmonic content.

The serial buffer gate composite waveform may operate simultaneous with the serial register gates and cease when the serial register gates stop. This allows the image signal charge to be transferred into the serial register. Alternately, the serial buffer gate waveform may operate continuously, as shown in waveform 1605. Continuous operation may alleviate start-up issues for the serial buffer gate drive circuit or the associated power supply where the first few waveform cycles provide a slight voltage difference or timing shift compared to later cycles.

Figure 12:
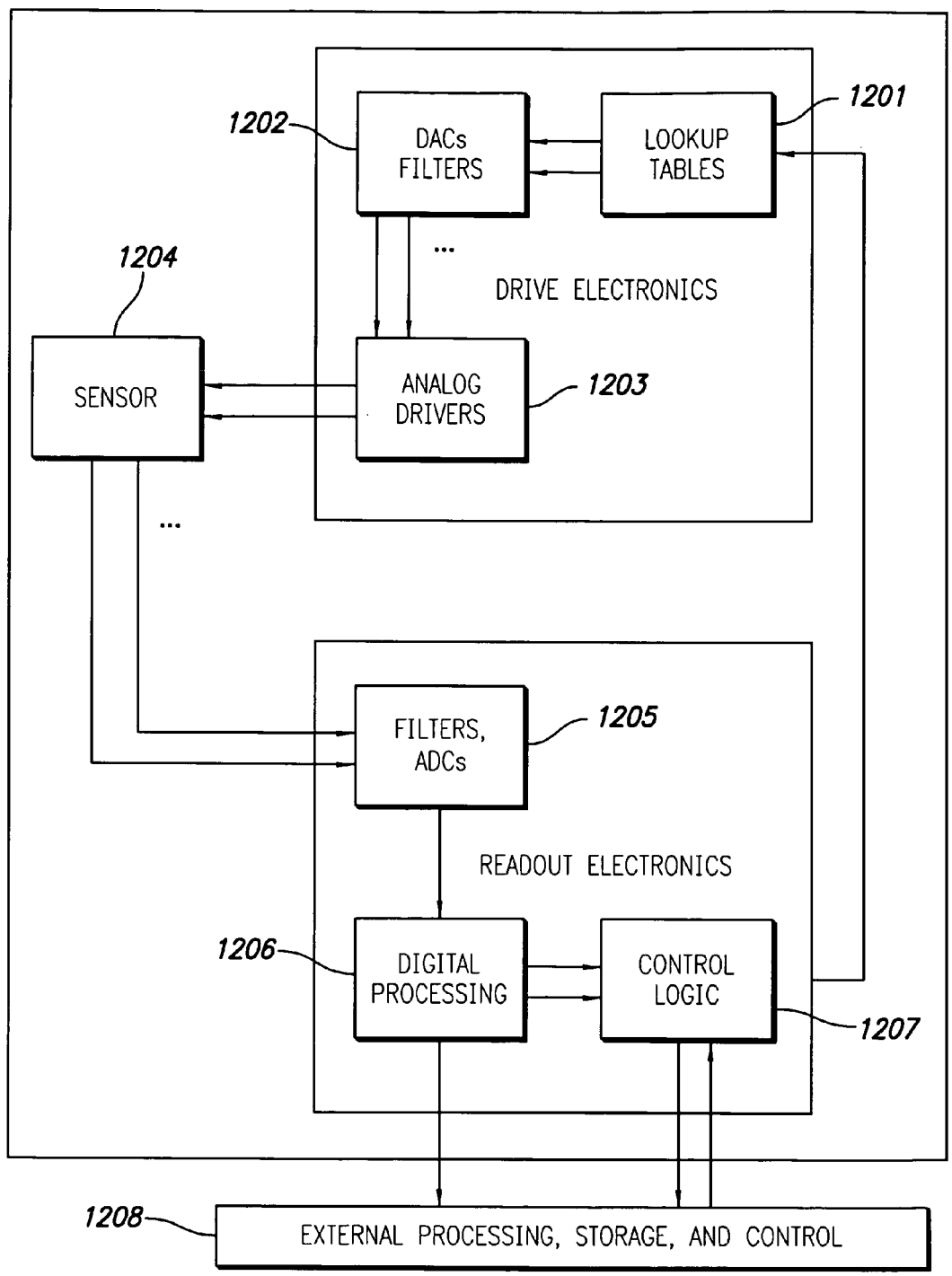
FIG. 12 shows the apparatus for continuous clocking including digital lookup tables, digital-to-analog conversion, analog-to-digital conversion, digital processing, and control of the waveforms.

One embodiment of an apparatus implementing features described herein is shown in FIG. 12. The apparatus includes four major sections designated "Drive Electronics," "Sensor," "Readout Electronics," and "External Storage, Processing, and Control." Within the drive electronics section may be a series of lookup tables 1201 of values describing waveform shapes and related drive signal information, circuitry such as digital-to-analog converters (DACs) along with signal filters 1202, and signal drivers 1203, typically analog, to amplify the signals and deliver them to the sensor 1204. The sensor 1204 provides analog output to the readout electronics section. The readout electronics section may include circuitry such as filters and analog-to-digital converters 1205, digital processing circuitry 1206, and control logic 1207. The control logic 1207 and other sections may interface with external storage, processing, and control systems 1208 for higher level control as well as low level synchronization, such as clock interfacing. The control logic 1207 may directly feed back in real-time or at predefined intervals to the lookup tables 1201 to modify waveforms and related data as needed to optimize synchronization and other sensor performance parameters.

The design presented herein and the specific aspects illustrated are meant not to be limiting, but may include alternate components while still incorporating the teachings and benefits of the invention, namely the transfer of charge within a TDI sensor using continuous clocking or nonsquare voltage waveforms. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method of inspecting specimens using a time division and integration (TDI) sensor, the TDI sensor operating to advance an accumulated charge between gates of the TDI sensor, the method comprising:

controlling waveforms advancing the accumulated charge between gates of the TDI sensor to be substantially nonsquare shaped waveforms wherein waveforms are controlled by operating at different voltage phases in adjacent gates to provide a substantially de minimis net voltage.

2. The method of claim 1 wherein the waveforms are controlled to generate a net substrate current on the TDI sensor of zero.

3. The method of claim 1, wherein at least one nonsquare shaped waveform is substantially sinusoidal.

4. The method of claim 1, wherein at least one nonsquare shaped waveform is substantially trapezoidal.

5. The method of claim 1, wherein at least one nonsquare shaped waveform comprises a composite waveform.

6. The method of claim 5, wherein said composite waveform comprises a fundamental sinusoidal wave operating at a line rate frequency combined with at least one odd-numbered harmonic having lower amplitude than said fundamental sinusoidal wave.

7. The method of claim 5, wherein at least one nonsquare shaped waveform further comprises an inverse of residual fluctuations created by said composite waveform.

8. The method of claim 1, wherein said TDI sensor comprises three gates per pixel, where phases of three voltage waveforms corresponding to said gates are shifted by 120 degrees compared to adjacent phases.

9. The method of claim 8, wherein the sum of the slopes of said three voltage waveforms applied to said gates is de minimis.

10. The method of claim 1, wherein said TDI sensor comprises four gates per pixel, where phases of four voltage waveforms corresponding to said gates are shifted by 90 degrees compared to adjacent phases.

11. The method of claim 10, wherein the sum of the slopes of said four voltage waveforms applied to said gates is de minimis.

12. The method of claim 1 wherein said TDI sensor comprises two gates per pixel, where phases of two voltage waveforms corresponding to said gates are shifted by 180 degrees compared to adjacent phases.

13. The method of claim 12 wherein the sum of the slopes of said two voltage waveforms applied to said gates is de minimis.

14. The method of claim 1, wherein said TDI sensor produces an image, and wherein movement of the image is substantially synchronized within less than approximately one-half pixel to the movement of stored charge on said TDI sensor.

15. The method of claim 1, wherein voltage waveform shapes are digitally synthesized.

16. The method of claim 1, wherein the TDI sensor comprises at least one readout amplifier, and wherein each readout amplifier operates while said TDI sensor transfers charge within an image area of the TDI sensor.

17. The method of claim 16, wherein each readout amplifier operates substantially continuously.

18. A time division and integration (TDI) sensor comprising an image area, the TDI sensor comprising:

a transfer gate employed to transfer charge received from the image area of the TDI sensor; and a buffer gate interposed between the image area and the transfer gate, said buffer gate operated to propagate charge through the image area of the TDI sensor using a nonsquare voltage waveform.

19. The TDI sensor of claim 18, wherein said nonsquare voltage waveform is substantially sinusoidal.

20. The TDI sensor of claim 18, wherein said nonsquare voltage waveform comprises a composite waveform.

21. The TDI sensor of claim 18, wherein said TDI sensor comprises at least two gates per pixel, where phases of voltage waveforms corresponding to each of said gates are shifted by 360 degrees divided by the number of gates per pixel as compared to adjacent phases.

22. The TDI sensor of claim 21, wherein the sum of the slopes of all voltage waveforms applied to said gates is de mimmis.

23. The TDI sensor of claim 18, further comprising at least one readout amplifier, and wherein each readout amplifier operates while said TDI sensor transfers charge within the image area of the TDI sensor.

24. The TDI sensor of claim 23, wherein each readout amplifier operates substantially continuously.

25. The TDI sensor of claim 18, further comprising a substrate comprising impurity atoms proximate at least one buffer gate.

26. The TDI sensor of claim 25, wherein said impurity atoms form a barrier inhibiting movement of charge from at least one transfer gate back into at least one buffer gate.

27. A method of advancing accumulated charge in a time delay and integration (TDI) sensor, said TDI sensor comprising an image area and further comprising a buffer gate located between the image area and a transfer gate, the method comprising:

controlling voltage waveform shapes advancing the accumulated charge between gates within the image area of the TDI sensor, wherein said controlling comprises applying a composite waveform voltage to said buffer gate.

28. The method of claim 27, wherein the composite waveform voltage comprises a voltage increasing relatively slowly to a peak value, followed by a sharp dropoff.

29. The method of claim 27 wherein the voltage waveform shapes are controlled to generate a net substrate current on the TDI sensor of zero.

30. The method of claim 27, wherein said TDI sensor comprises a first plurality of gates per pixel, where phases of voltage waveforms corresponding to said gates are shifted by 360 degrees divided by the first plurality as compared to adjacent phases.

31. The method of claim 30, wherein the sum of the slopes of said voltage waveforms applied to said gates is de minimis.

32. The method of claim 27, wherein said TDI sensor produces an image, and wherein movement of the image is substantially synchronized within less than approximately one-half pixel to the movement of stored charge on said TDI sensor.

33. The method of claim 27, wherein the TDI sensor comprises at least one readout amplifier, and wherein each readout amplifier operates while said TDI sensor transfers charge within the image area of the TDI sensor.

34. The method of claim 33, wherein each readout amplifier operates substantially continuously.

35. A method for controlling voltage waveform shapes between gates in a time delay and integration (TDI) sensor, the TDI sensor comprising a buffer gate located between an image area and a transfer gate, comprising:

applying a digital voltage wave to said transfer gate; and applying an inverted voltage wave to said buffer gate, wherein said inverted voltage wave is inverted with respect to the digital voltage wave applied to said transfer gate.

36. The method of claim 35 wherein the digital voltage wave and inverted voltage wave are controlled to generate a net substrate current on the TDI sensor of zero.

37. The method of claim 35, wherein said TDI sensor comprises a first plurality of gates per pixel, where phases of voltage waveforms corresponding to said gates are shifted by 360 degrees divided by the first plurality as compared to adjacent phases.

38. The method of claim 35, wherein the sum of the slopes of said voltage waveforms applied to said gates is de mimmis.

39. The method of claim 35, wherein said TDI sensor produces an image, and wherein movement of the image is substantially synchronized within less than approximately one-half pixel to the movement of stored charge on said TDI sensor.

40. The method of claim 35, wherein the TDI sensor comprises at least one readout amplifier, and wherein each readout amplifier operates while said TDI sensor transfers charge within the image area of the TDI sensor.

41. The method of claim 40, wherein each readout amplifier operates substantially continuously.

42. A method of controlling charge propagation in a time division and integration (TDI) sensor, comprising:
controlling voltage waveform shape advancing an accumulated charge from gate to gate within a serial register area of said TDI sensor;
wherein the voltage waveform shapes are controlled to generate a de minimis net substrate current on the TDI sensor.

43. The method of claim 42, wherein said TDI sensor comprises a first plurality of gates per pixel, where phases of voltage waveforms corresponding to said gates are shifted by 360 degrees divided by the first plurality as compared to adjacent phases.

44. The method of claim 43, wherein the sum of the slopes of said voltage waveforms applied to said gates is de mimmis.

45. The method of claim 42, wherein said TDI sensor produces an image, and wherein movement of the image is substantially synchronized within less than approximately one-half pixel to the movement of stored charge on said TDI sensor.

46. The method of claim 42, wherein the TDI sensor comprises at least one readout amplifier, and wherein each readout amplifier operates while said TDI sensor transfers charge within an image area of the TDI sensor.

47. The method of claim 46, wherein each readout amplifier operates substantially continuously.

48. The method of claim 42 wherein said voltage waveforms are substantially sinusoidal.

49. The method of claim 42 wherein said voltage waveforms are nonsquare.

50. The method of claim 42 wherein said voltage waveforms are composite waveforms comprising a fundamental sinusoidal wave operating at pixel readout frequency added at least one odd-numbered harmonic having lower amplitude than said fundamental sinusoidal wave.

51. A TDI sensor comprising a serial register and floating diffusion region, the TDI sensor comprising:
a serial buffer gate interposed between the serial register area and the floating diffusion region configured to serially move charge from registers in the serial register area to the floating diffusion region using a composite waveform.

52. The TDI sensor of claim 51, wherein said composite waveform comprises smooth continuous features and discontinuous features.

53. A TDI sensor comprising:
a buffer gate interposed between a serial register area and a floating diffusion region, wherein said buffer gate is operated continuously when operation of the serial register area stops.

54. The TDI sensor of claim 51, wherein the serial buffer gate has a serial buffer gate waveform comprising a square wave.

55. The TDI sensor of claim 51, wherein the serial buffer gate has a serial buffer gate waveform comprising a composite waveform including a sinusoidal portion and a step portion.

56. The TDI sensor of claim 51, wherein the serial buffer gate has a serial buffer gate waveform comprising a continuous composite waveform.

57. The TDI sensor of claim 53, wherein continuous operation of said buffer gate enables receiving signal charge from an image region of the TDI sensor.

58. A method of controlling charge propagation in a TDI sensor, comprising:
employing a fundamental frequency and significant harmonic TDI sensor drive waveforms that vary in frequency in proportion to an operating line rate of the TDI sensor.

59. The method of claim 58 wherein the fundamental frequency and significant harmonic TDI sensor drive frequencies comprise voltage waveform shapes that are controlled to generate a net substrate current on the TDI sensor of zero.

60. The method of claim 59, wherein said TDI sensor comprises a first plurality of gates per pixel, where phases of voltage waveforms corresponding to said gates are shifted by 360 degrees divided by the first plurality as compared to adjacent phases.

61. The method of claim 60, wherein the sum of the slopes of said voltage waveforms applied to said gates is de minimis.

62. The method of claim 58, wherein the TDI sensor comprises at least one readout amplifier, and wherein each readout amplifier operates while said TDI sensor transfers charge within an image area of the TDI sensor.

63. The method of claim 62, wherein each readout amplifier operates substantially continuously.

64. A time division and integration (TDI) sensor comprising a plurality of gates, comprising:
means for controlling voltage waveform shapes for waveforms advancing an accumulated charge between the gates of the TDI sensor using substantially nonsquare waveforms, wherein said voltage waveform shape controlling means operates adjacent gates at different voltage phases thereby providing a substantially de minimis net voltage.

65. The TDI sensor of claim 64 wherein the voltage waveform shape controlling means operates to generate a net substrate current on the TDI sensor of zero.

66. The TDI sensor of claim 64, wherein said nonsquare voltage waveform is substantially sinusoidal.

* * * * *

UNITED STATES PATENT AND TRADEMARK OFFICE
CERTIFICATE OF CORRECTION

PATENT NO. : 7,609,309 B2  
APPLICATION NO. : 10/992063  
DATED : October 27, 2009  
INVENTOR(S) : Brown et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Twelfth Day of October, 2010

David J. Kappos  
*Director of the United States Patent and Trademark Office*